United States Patent
Lugg

(10) Patent No.: US 11,653,631 B2
(45) Date of Patent: May 23, 2023

(54) LEASH LOCKING MECHANISM

(71) Applicant: Nathaniel Lugg, Lynnwood, WA (US)

(72) Inventor: Nathaniel Lugg, Lynnwood, WA (US)

( * ) Notice: Subject to any disclaimer, the term of this patent is extended or adjusted under 35 U.S.C. 154(b) by 0 days.

(21) Appl. No.: 17/685,152

(22) Filed: Mar. 2, 2022

(65) Prior Publication Data

US 2022/0279759 A1 Sep. 8, 2022

Related U.S. Application Data

(60) Provisional application No. 63/155,739, filed on Mar. 3, 2021.

(51) Int. Cl.
*A01K 27/00* (2006.01)

(52) U.S. Cl.
CPC .......... *A01K 27/005* (2013.01); *A01K 27/003* (2013.01)

(58) Field of Classification Search
CPC .. A01K 27/001; A01K 27/003; A01K 27/002; A01K 27/005; A44B 11/2515; A44B 11/2519; A44B 11/2592
See application file for complete search history.

(56) References Cited

U.S. PATENT DOCUMENTS

| | | | | |
|---|---|---|---|---|
| 5,005,527 A | * | 4/1991 | Hatfield | A01K 27/005 119/793 |
| 5,099,799 A | * | 3/1992 | Giacobbe | A01K 27/003 119/793 |
| 7,174,859 B2 | | 2/2007 | Lee | |
| 8,572,820 B2 | | 11/2013 | Richards | |
| 8,869,654 B2 | | 10/2014 | Fidrych | |
| 8,925,496 B2 | * | 1/2015 | Simons | A01K 13/00 119/856 |
| 9,415,247 B2 | | 8/2016 | Schurian et al. | |
| 9,578,929 B2 | | 2/2017 | Hung | |
| 2017/0142936 A1 | * | 5/2017 | Louro | A01K 27/005 |
| 2017/0332742 A1 | * | 11/2017 | Moran | A44B 11/2569 |
| 2019/0246607 A1 | | 8/2019 | Chen | |
| 2019/0320618 A1 | * | 10/2019 | Simons | A01K 27/003 |
| 2020/0214260 A1 | | 7/2020 | Beck | |
| 2021/0185985 A1 | * | 6/2021 | Therrian | A01K 27/003 |

* cited by examiner

*Primary Examiner* — Trinh T Nguyen
(74) *Attorney, Agent, or Firm* — Bold IP, PLLC; Binita Singh

(57) ABSTRACT

The present invention is a locking device that can be integrated onto a leash, and which provides a solution to the problem of slip-on collars over tightening or being inconvenient to use. The locking device comprises of a main body, a lock piece, a hook, and one or more arms. The one or more arms are connected within the main body to engage with the hook and the lock piece to lock a width of a collar portion which is formed from the pieces integrated onto the leash. The main body is configured to slide on the leash, and the lock piece is fixed onto the leash and when the lock piece slides into the main body, the main body is prevented from sliding. The hook is connected to a first end of the leash and when inserted into the main body forms the collar portion.

18 Claims, 16 Drawing Sheets

LEASH LOCKING MECHANISM

CROSS REFERENCE TO RELATED APPLICATION

This application is a non-provisional application which claims priority to U.S. Provisional Patent Application No. 63/155,739 filed on Mar. 3, 2021, which is incorporated by reference in its entirety.

FIELD OF THE DISCLOSURE

The present invention is directed to locking devices, and more particularly to a locking device that can be integrated onto a flat webbing.

BACKGROUND

Dog collars of various types exist. Some collars have a loop that passes over the dog's head and then is tightened. These collars generally take the form of "choker" collars that have no mechanism to stop the collar from tightening or loosening and are held on the dog's neck by keeping tension on the collar. Choker collars can restrict the breathing of a dog wearing the collar with enough tension. Further, if no tension is kept on the choker collar the collar may become loose and move out of position (e.g., over the head of the dog or tangled in the legs of the dog) or even fall off the dog.

Some collars exist that slip over the head of the dog and include mechanisms to stop the collar from becoming too tight. Others include mechanisms that prevent the collar from becoming too loose. However, all of these attempts have been inconvenient for a variety of reasons. One example of these inconvenient solutions is a collar with a strap that includes holes through which a locking mechanism may pass through to keep the collar from tightening or loosening. This solution is inconvenient because a person putting on the collar must place the locking mechanism in a hole while the collar is around the dog's neck, which may be difficult when a dog is excited to go outside or otherwise is not being compliant, and which is far less convenient than a choker collar which simply slips over the dog's head and is ready to use.

Another example of an inconvenient solution is a collar with a disc or similar device on the strap to prevent the collar from becoming too tight. Although many of these collars can be easily slipped over the head of the dog, the disc does not prevent the collar from becoming too loose or falling off the dog. Also, it can be difficult or impossible to adjust the collar size on the dog because the disc must be fixed to a location on the strap to prevent the collar from tightening.

SUMMARY

One or more embodiments are provided below for a locking device that may be used with a leash. The locking device may be integrated onto a webbing material to form a a slip-on leash for a dog or another animal. In other words, the locking device integrated onto a webbing material may form a leash and collar all in one and that with the locking device the collar can be set to a certain width and then locked to prevent overtightening or loosening. The locking device may also be included on a dog collar that can be slipped around a dog's neck or another animal's neck. The locking device may also be on any other object that can benefit from such a locking device. The locking device may include a main body that is divided into a first section and a second section. One or more arms are connected within the second section. The locking device may also include a locking piece and a hook. The locking piece is configured to fit within the first section of the main body and includes a tab that projects outward from the locking piece which engages with an overhanging portion on one of the arms of the one or more arms to securely lock the locking piece within the main body. The hook is configured to fit within the second section with the one or more arms holding the hook in place within the second section of the main body. The one or more arms may be moved by pressing on to release the locking piece, the hook, or both.

The disclosed device is unique and may provide significant advantages when compared with other devices and solutions known in the arts because it provides a locking device that may be used with a slip-on dog leash or dog collar which prevents the device from tightening or loosening as the leash or collar is being pulled on. The disclosed device also provides a convenient method for putting or removing a slip-on dog leash or dog collar. Additionally, the locking device, when included on a slip-on dog leash or dog collar, allows for convenient adjustments in size of a collar portion of a strap of the device.

Other advantageous features as well as other aspects and advantages of the invention will be apparent from the following description and the appended claims.

BRIEF DESCRIPTION OF THE DRAWINGS

Embodiments of the present disclosure are described in detail below with reference to the following drawings. These and other features, aspects, and advantages of the present disclosure will become better understood with regard to the following description, appended claims, and accompanying drawings. The drawings described herein are for illustrative purposes only of selected embodiments and not all possible implementations and are not intended to limit the scope of the present disclosure.

DETAILED DESCRIPTION

Figure 1:
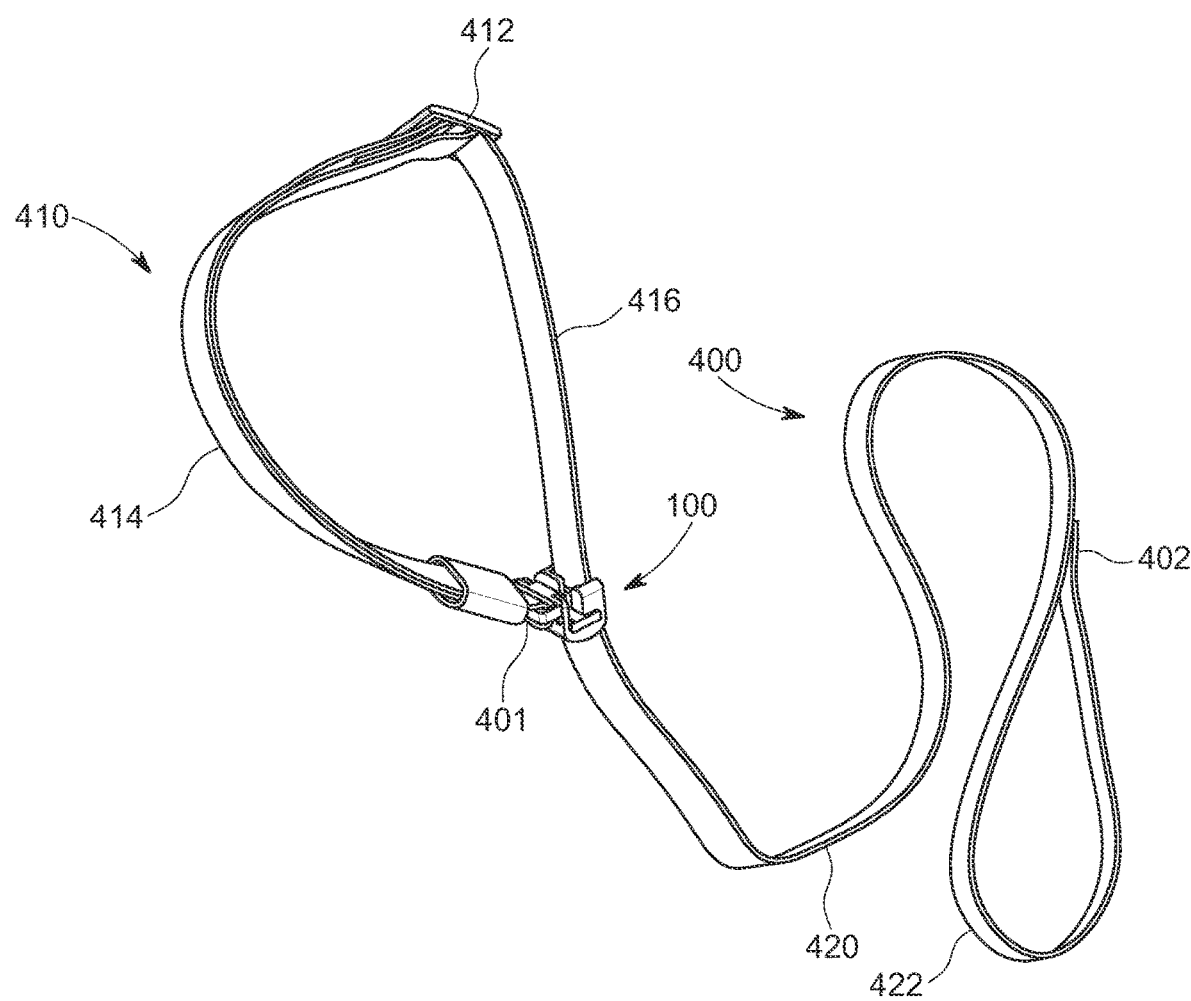
FIG. 1 shows an example perspective view of a locking device integrated onto a leash according to one or more non-limiting embodiments.

In the Summary above, in this Detailed Description, the claims below, and in the accompanying drawings, reference is made to particular features of the invention. It is to be understood that the disclosure of the invention in this specification includes all possible combinations of such particular features. For example, where a particular feature is disclosed in the context of a particular aspect or embodiment of the invention, or a particular claim, that feature can also be used—to the extent possible—in combination with and/or in the context of other particular aspects and embodiments of the invention, and in the invention generally.

The term "comprises" and grammatical equivalents thereof are used herein to mean that other components, ingredients, steps, etc. are optionally present. For example, an article "comprising" (or "which comprises") components A, B, and C can consist of (i.e., contain only) components A, B, and C, or can contain not only components A, B, and C but also contain one or more other components.

Where reference is made herein to a method comprising two or more defined steps, the defined steps can be carried out in any order or simultaneously (except where the context excludes that possibility), and the method can include one or more other steps which are carried out before any of the defined steps, between two of the defined steps, or after all the defined steps (except where the context excludes that possibility).

The term "at least" followed by a number is used herein to denote the start of a range including that number (which may be a range having an upper limit or no upper limit, depending on the variable being defined). For example, "at least 1" means 1 or more than 1. The term "at most" followed by a number is used herein to denote the end of a range, including that number (which may be a range having 1 or 0 as its lower limit, or a range having no lower limit, depending upon the variable being defined). For example, "at most 4" means 4 or less than 4, and "at most 40%" means 40% or less than 40%. When, in this specification, a range is given as "(a first number) to (a second number)" or "(a first number)-(a second number)," this means a range whose limits include both numbers. For example, "25 to 100" means a range whose lower limit is 25 and upper limit is 100 and includes both 25 and 100. Certain terminology and derivations thereof may be used in the following description for convenience in reference only and will not be limiting. For example, words such as "upward," "downward," "left," and "right" would refer to directions in the drawings to which reference is made unless otherwise stated. Similarly, words such as "inward" and "outward" would refer to directions toward and away from, respectively, the geometric center of a device or area and designated parts thereof. References in the singular tense include the plural, and vice versa, unless otherwise noted.

The term "coupled to" as used herein may mean a direct or indirect connection via one or more components.

Referring now to the drawings and the following written description of the present invention, it will be readily understood by those persons skilled in the art that the present invention is susceptible to broad utility and application. Many embodiments and adaptations of the present invention other than those herein described, as well as many variations, modifications, and equivalent arrangements will be apparent from or reasonably suggested by the present invention and the detailed description thereof, without departing from the substance or scope of the present invention. This disclosure is only illustrative and exemplary of the present invention and is made merely for purposes of providing a full and enabling disclosure of the invention.

FIG. 1 shows a perspective view of an example of a non-limiting embodiment of a locking device 100 integrated onto a leash 400 that is adapted to be slipped onto an animal's neck, such as a dog. For the remainder of this disclosure, the leash 400 and locking device 100 will be used with a dog, as an example. The locking device 100 is integrated onto a leash 400 to form a collar section 410 and a strap section 420. The collar section 410 of the leash 400 forms a loop that is placed around the dog's neck. The collar section 410 further includes an adjustment piece 412, such as and not limited to a buckle or a slide glider, that allows the collar section 410 to widen or shorten. The strap section 420 of the leash may include a handle 422. The leash 400 may be similar to other leashes that are known and available in the arts or will be in the future. The leash 400 integrated with the locking device 100 can come in many sizes and lengths to accommodate small, medium, and large sized dogs. The leash 400, for example, may have a length of about 5-8 feet. In some example embodiments, the leash 400 may be parts of a single continuous webbing strap, cord, chain, rope, or other similar material. In other embodiments, portions of the leash 400 may be made of different materials.

The handle 422 and the collar portion 410 are formed on opposite ends of the leash 400 with a length of the strap 420 separating the two. The leash 400 may have a first end 401 and a second end 402. The collar portion 410 is formed near the first end 401. The handle 422 is formed near the second end 402, which may be formed by doubling over the strap 400 and attaching (by sewing, glue, rivet, etc.) the second end 402 of the leash 400 to another portion of the strap 422 to form a loop sized for a human hand. The adjustment piece 412 is attached to the leash 400 within the collar section 410. As mentioned above, the adjustment piece 412 allows the collar section 410 to widen or shorten the loop to fit around a dog's neck. It is to be understood that this is an example of how the leash 400 may be formed, however, there are variations to other forms and shapes that the leash 400 may take.

Figure 2:
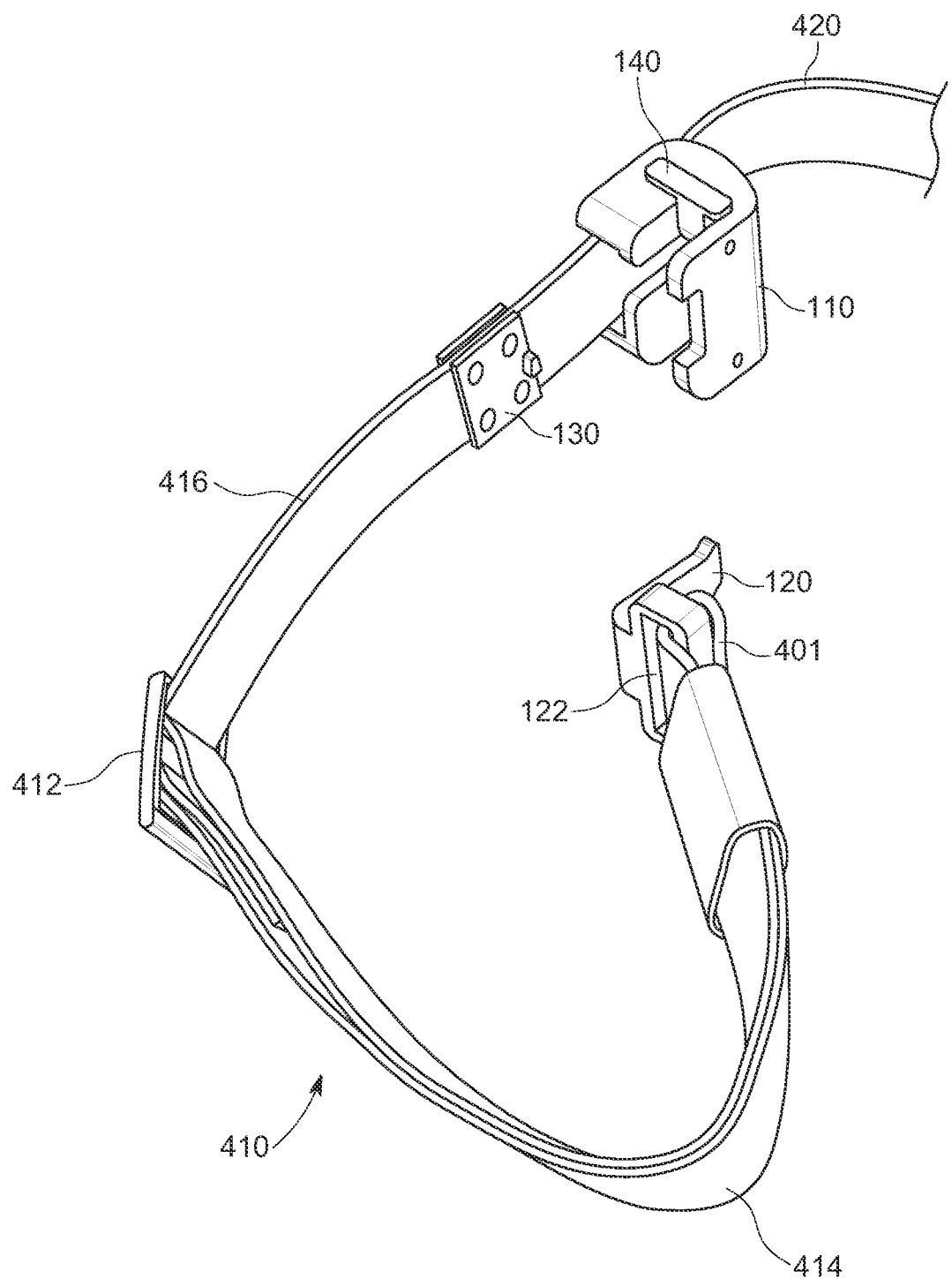
FIG. 2 shows a close-up view of collar section of the leash with the locking device according to one or more non-limiting embodiments.
Figure 3A:
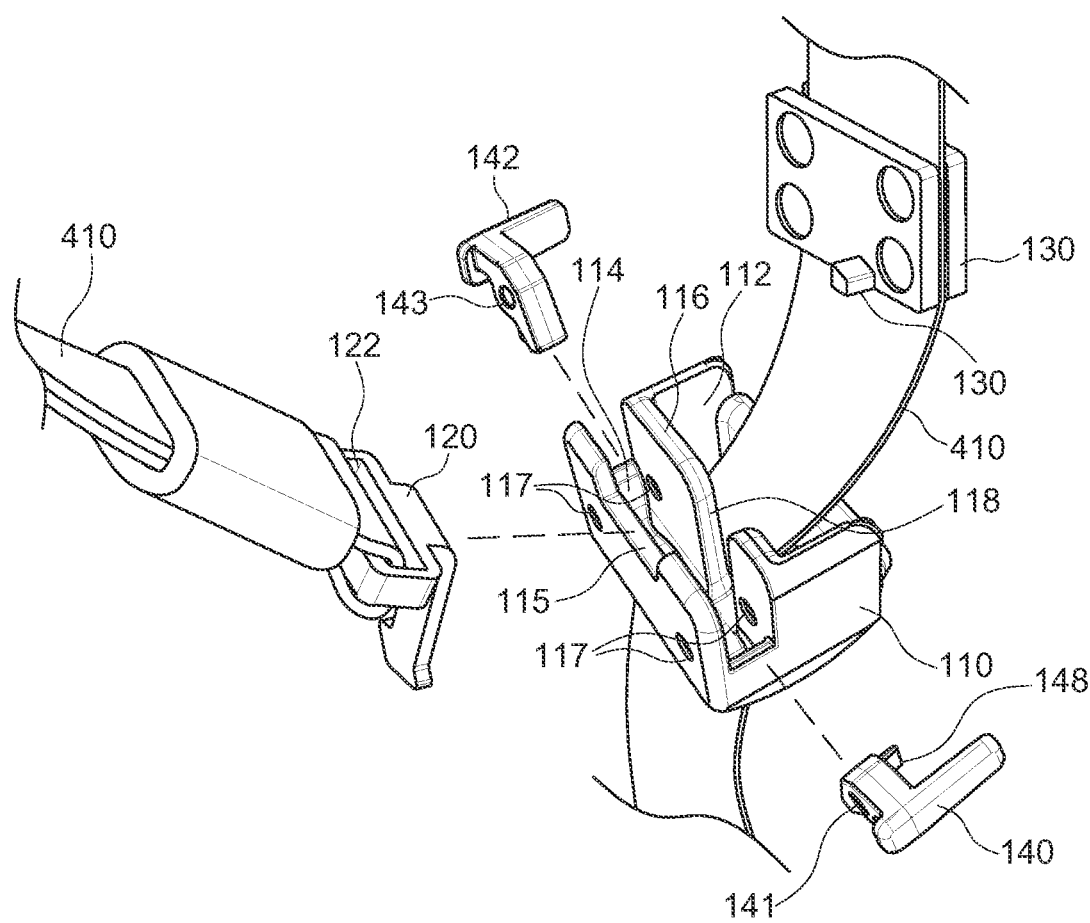
FIG. 3A shows an exploded view of the locking device according to one or more non-limiting embodiments.
Figure 3B:
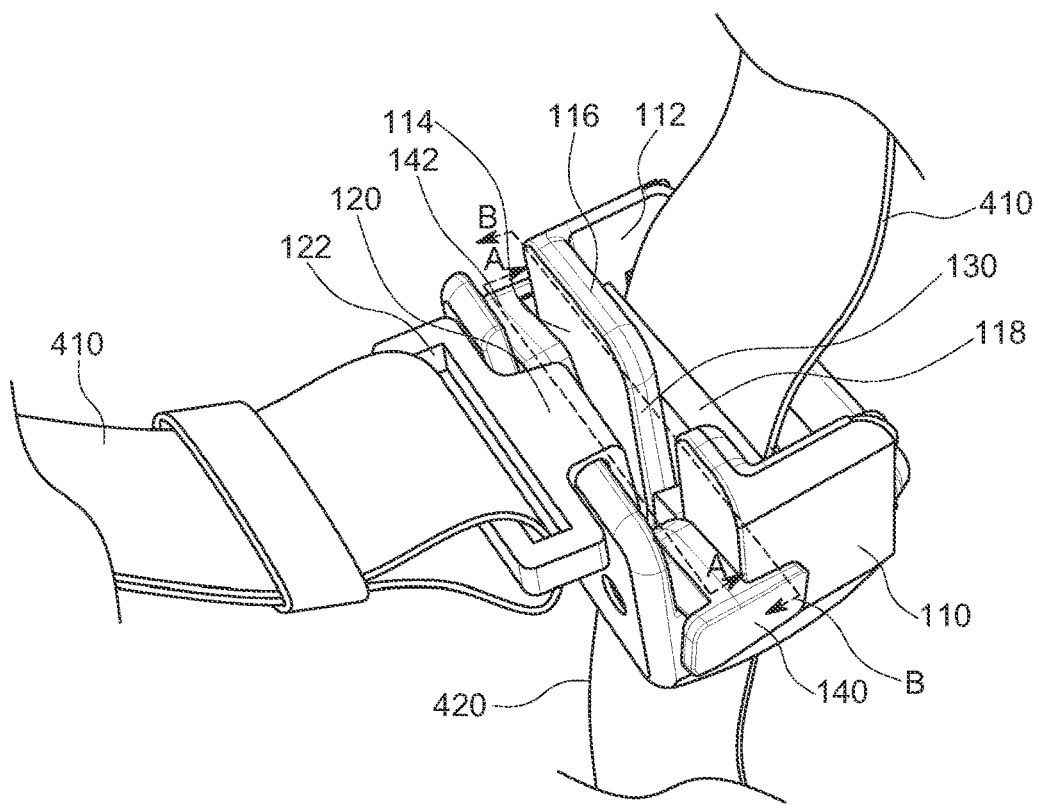
FIG. 3B shows a close-up view of the locking device in an engaged position according to one or more non-limiting embodiments.

Refer to FIGS. 2, 3A, and 3B regarding the locking device 100 integrated on to the leash 400. FIG. 2 is close-up view of the collar section 410 of the leash 400 with the locking device in an unengaged position. FIG. 3A is an exploded view of the locking device 100. FIG. 3B is a close-up view of the locking device 100 in a fully engaged position. As shown in FIG. 2, the locking device 100 is integrated onto the leash 400 and the placement of the different elements of the locking device 100 assist in forming the collar section 410 of the leash 400. The locking device 100 comprises of a main body 110, a hook, 120, a lock piece 130, and one or more arms 140, 142. The hook 120 is connected to the first end 401 of the leash 400. The lock piece 130 is fixedly connected to the leash 400 and is positioned between the adjustment piece 412 and the main body 110 which is positioned on the leash 400 between the lock piece 130 and the handle 422. The adjustment piece 412 of the leash is between the hook 120 and the lock piece 130. In other words, when looking at the leash 400 from the first end 401 to the second end 402, the hook 120 is connected to the first end 401, next is the adjustment piece 412 on the leash 400, next is the locking piece 130 which is fixed onto the leash, then the main body 110 of the locking device 100, then the strap section 420, and lastly the handle 422 configured from looping the second end 402.

Figure 4:
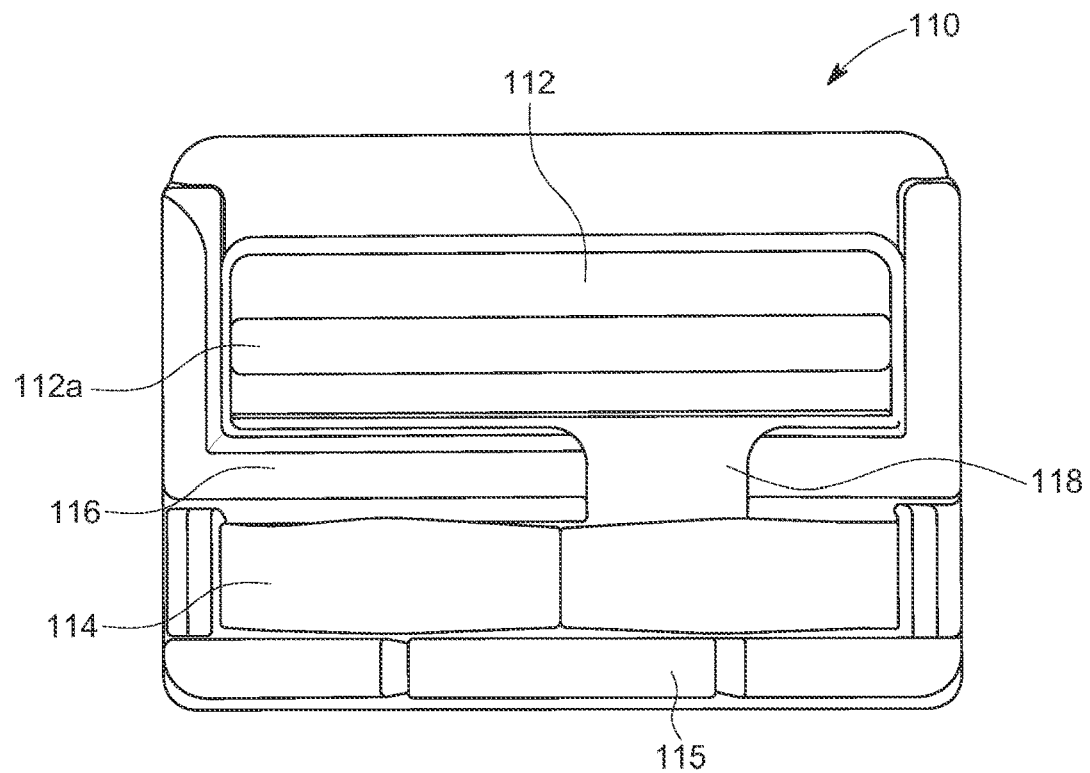
FIG. 4 shows an example top view of a main body of the locking device according to one or more non-limiting embodiments.

FIG. 2 illustrates that the lock piece 130 is fixedly connected to the leash 400, and the leash 400 may then pass through a slit 112a (shown in FIG. 4) in the main body 110 on a side that moves toward the second end 402 which has the handle 422. From the lock piece 130, on a side moving toward the first end 401, the leash 400 may pass through the adjustment piece 412 (with the fixed lock piece 130 positioned between the main body 110 and the adjustment piece 412). From the adjustment piece 412, the leash 400 may then pass through an opening 122 in the hook 120 of the locking device 100 and loop back to the adjustment piece 412. Because a section of the collar portion 410 between the hook 120 and the adjustment piece 412 is a looped section 414, the adjustment piece 412 can be used to adjust the length of the collar portion 410, which will be discussed below.

The strap portion 420 of the leash 400 may slide through the slit 112a (See, FIG. 4) in the main body 110 of the locking device 100, except when the lock piece 130 is engaged with the main body 110, which will be discussed in more detail below. In other words, the main body 110 is not fixed to the leash 400 such that the main body 110 may slide along the strap portion 420 between the handle and the lock piece 130. When the lock piece 130 is engaged with the main body 110, the main body 110 is prevented from sliding on the leash 400. When the lock piece 130 is not engaged with the main body 110, the collar portion 410 may be widened allowing for the collar portion 410 to be placed over the head of a dog. Then, the lock piece 130 may be slid toward the main body 110 by pulling on the strap section 420 to engage the lock piece 130 with the main body 110 to lock and prevent further movement of the main body 110 on the leash 400 and lock a size of the collar portion 410. The one or more arms 140, 146 are connected to the main body 110 and may be used to engage and disengage the lock piece 130 from the main body 110. Additionally, the one or more arms 140, 142 may also be used to engage and disengage the hook 120 from the main body 110. The hook 120 when engaged is attached to the main body 110, and when disengaged can be removed from the main body 110, allowing the collar portion 410 of the leash 400 to fully open and undo the loop of the collar portion 410. Removing the hook 120 from the main body 110 allows the collar portion 410 to come off the dog's neck quickly.

The size of the loop of the collar portion 410 may be adjusted using the adjustment piece 412. The looped section 414, and a straight section 416 (a section between the lock piece 130 and the adjustment piece 412) together determine the length of the loop of the collar portion 410 (when the lock piece 130 is engaged with the main body 110). By moving the adjustment mechanism 412, the looped section 414 can be lengthened or shortened, and this changes the size of the loop of the collar portion 410. The size of the loop of the collar portion may be increased (and conversely the length of the looped section 414 can be shortened) when the adjustment mechanism 412 is slid away from the lock piece 130 and toward the hook 120 of the locking device 100. The size of the loop of the collar portion 410 may be decreased (and conversely the length of the looped section 414 may be increased) when the adjustment piece 412 is moved toward the lock piece 130 and away from the hook 120 of the locking device 100.

Referring specifically to the locking device 100, FIGS. 3A and 3B illustrate the elements that comprise the locking device 100 and how the key components are connected to each other to provide a useful functionality. Also referring to FIG. 4, a top view of a non-limiting example of the main body 110 is shown. The main body 110 provides a structural support for the remainder of the elements comprising the locking device 100. The main body 110 is configured with four sides connected to a closed bottom end and having an open top end. The terms "bottom" and "top" are strictly being used for reference purposes. The main body 110 is further configured with a first section 112 and a second section 114 separated by a center wall 116. The main body may be fashioned from a durable material including and not limited to plastic, metal, a composite, or other durable materials suited for withstanding the forces exerted by a dog pulling on a leash attached to the locking device 100.

The first section 112 and the second section 114 are configured to accept the lock piece 130 and the hook 120, respectively. The first section 112 has the slit 112a configured on the bottom end of the locking device 100. As mentioned above, the lock piece 130 is fixedly connected to the leash 400 and the slit 112a is adapted to allow the leash 400 to pass through when the locking device is attached to the leash 400. In operation, the leash 400 can slide back and forth through the slit 112a as the main body 110 is not fixed to the leash 400. In other words, the main body 110 is connected to the leash 400 by the leash 400 being inserted through the slit 112a. The leash 400 will slide through back and forth till the lock piece 130 slides into the first opening 112 from the open top end and is locked into place. The slit 112a has a width that allows the leash 400 to slide back and forth but not wide enough for the lock piece 130 to go through. In other words, the lock piece 130 abuts against the bottom end of the main body 110 which includes the slit 112a and allows the lock piece 130 to nest in first section 112 of the main body 110. The nesting of the lock piece 130 in the first section 112 of the main body 110 keeps the collar portion from tightening any further, so the width of the collar portion is set when the lock piece 130 is nesting in the main body 110.

The second section 114 is configured to include the one or more arms 140, 142. The one or more arms 140, 146 are attached to the main body 110 within the second section 114. As clearly seen in FIG. 3A, the second section 114 is configured with a depression 115 on the side defining part of the second section and which is parallel to the center wall 116. The depression 115 is included to allow the hook 120 to be inserted into the second section 114 and sit flush against the top side and further prevent any side-to-side movement of the hook 120, as shown in FIG. 3B. The second section further includes openings 117 that traverse the side of the main body 110 which defines part of the second section 114 and includes openings 117 in the center wall 116. The openings 117 on the side of the main body 110 and the center wall 116 are aligned together on the same plane so that the one or more arms 140, 146 may be to be connected to the main body 110 within the second section 114, which will be discussed below.

The first section 112 and the second section 114 of the main body 110 may be rectangular in shape. A rectangular shape is well suited for the leash 400 integrated with the lock device 130 that includes a flat shape for the leash 400. The first section 112 and second section 114 may have other shapes if the leash that passes through the first section 112 is a rope, chain, cable, etc. It is to be understood that the first section 112 and the second section 114 may have different shapes wherein the second section 114 may have a rectangular shape and the first section may have an alternate shape designed to accommodate the shape of the leash 400.

Figure 5A:
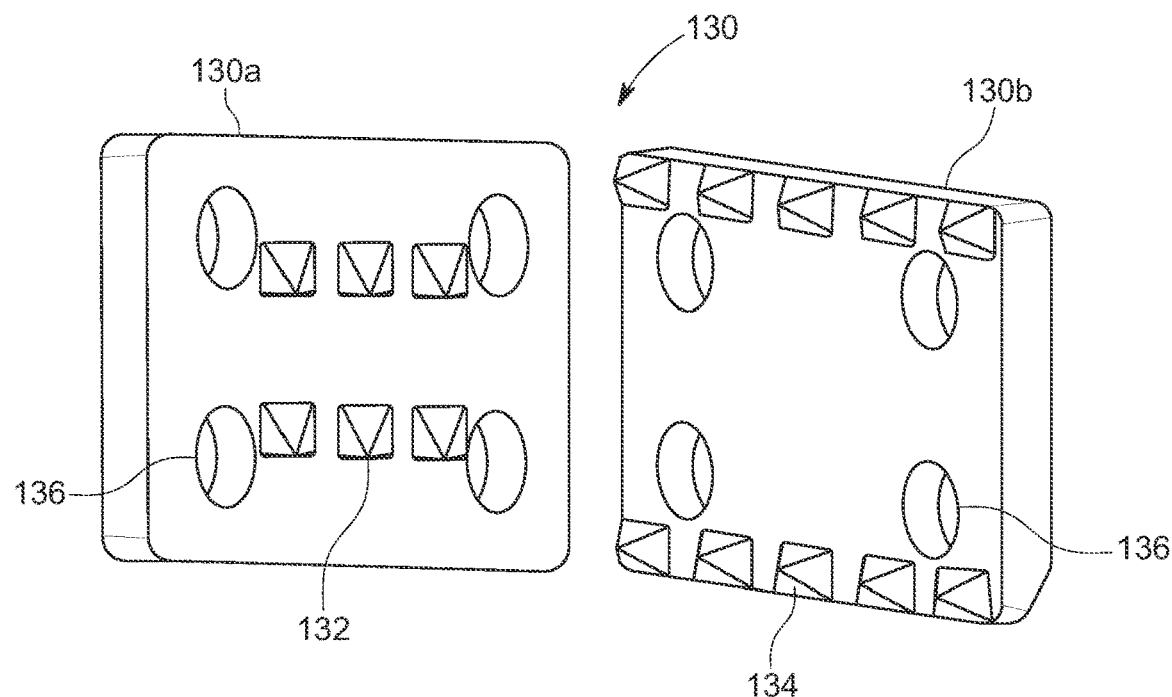
FIG. 5A shows an example of a lock piece of the locking device according to one or more non-limiting embodiments.
Figure 5B:
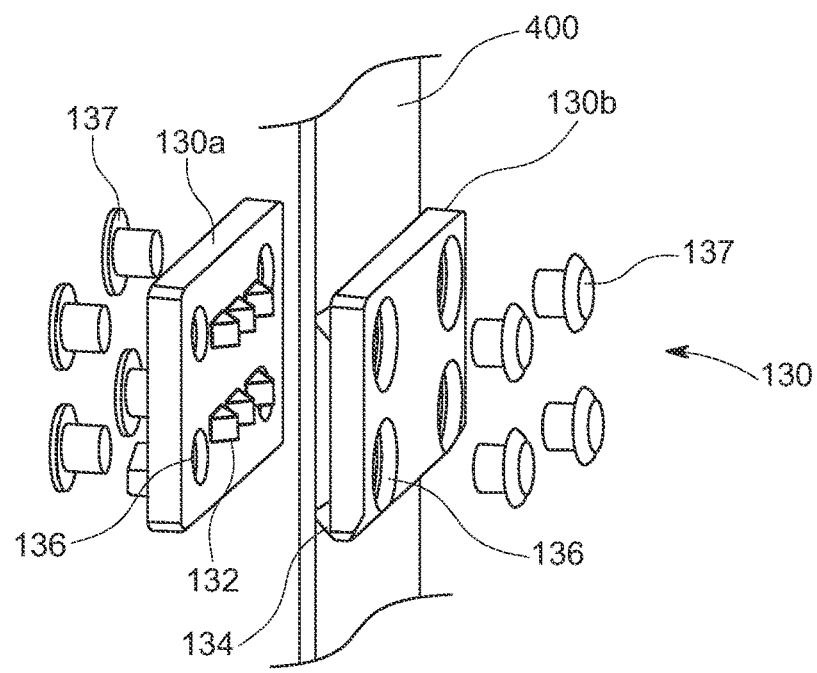
FIG. 5B shows the lock piece and the leash before the lock piece is fixed to the leash according to one or more non-limiting embodiments.
Figure 5C:
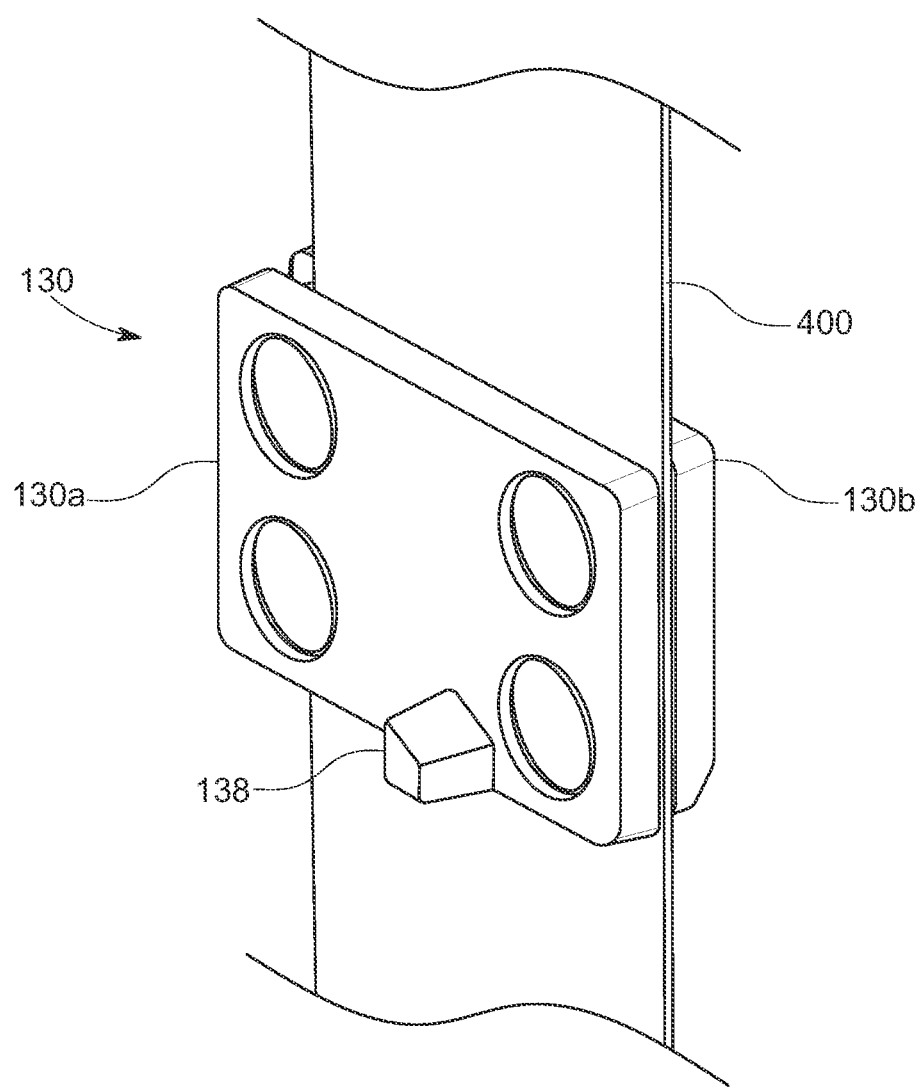
FIG. 5C shows the lock piece fixed onto the leash and further shows a projecting element on the lock piece according to one or more non-limiting embodiments.

The lock device 130 is depicted in FIGS. 3A-B and 5A-C. In FIG. 3A, the lock device 130 is shown to be integrated onto the leash 400 which is inserted into the slit 112a in the first section 112 of the main body 110. In FIG. 3B, the lock device is inserted into the first section and engaged with the one or more arms 140, 146, which will be discussed below. In FIGS. 5A-5C, the lock device 130 is shown to be comprised of two pieces, a first lock piece 130a and a second lock piece 130b which are fixed onto the leash 400 with the leash 400 between the first and second lock pieces 130a, 130b. As best seen in FIG. 5A, an inside surface of the first and second lock pieces 130a, 130b are shown. FIG. 5B shows that the inside surfaces of the first and second lock pieces 130a, 130b, face each other and attach to the leash 400. In some embodiments, the inside surfaces of the first and second lock pieces 130a, 130b are configured with a plurality of spikes 132, 134, respectively. One example of the spikes 132, 134, may be an arrowhead type appearance with a pointed tip. The spikes are useful to pierce into the leash 400 to partially secure the lock piece 130 to the leash 400. It is to be understood that the first and second lock pieces 130a, 130b, may not include the spikes 132, 134.

The first and second lock pieces 130a, 130b are attached to the leash 400 by using a securing element. Referring to FIGS. 5A-C, in one or more embodiments, the first and second lock pieces 130a, 130b, may have a plurality of holes 136 that traverse through each lock piece 130. The holes 136 on the first lock piece 130a and the second lock piece 130b align with each other when each lock piece 130 is placed onto the leash 400. The plurality of holes 136 allow the first and second lock pieces 130a and 130b to be fixed to the leash 400 and to each other. The plurality of holes 136 are particularly useful for using a fastener 137 to be placed through to attach the lock pieces 130 together to the leash 400. An example of a fastener 137 may include rivets. It is also to be understood that the first and second pieces 130a, 130b, may be fixed to each other and the leash 400 by using other securing elements such as and not limited to thread, glue, staples, or another securing element.

FIG. 5C shows an example side view of the lock device 130 on the leash 400. In this Figure, only the first lock piece 130a of the strap 100 is shown to allow for greater detail to be shown on the described portion. The first lock piece 130a has a projecting element 138 on an outward facing surface (surface opposite the side fixed to the leash 400) which is shaped to engage with the one or more arms 140, 142 to lock the locking device 130 into the main body 110. The first lock piece 130a with the projecting element 138 when slid into the first section 112 of the main body 110 enters facing the center wall 116. The center wall 116 has a groove 118 that is open from the top end of the main body 110 to the bottom end of the main body 110. The projecting element 138, as the name suggests, projects outward from the first lock piece 130a, and as the lock device slides into the first element 112, the projecting element is guided into the groove 118 of the center wall 116 (See, FIG. 7A).

As discussed earlier, the one or more arms 140, 142, are connected to the main body 110 within the second section 114. The one or more arms 140, 142, may be configured to cause the lock piece 130 to engage and disengage within the main body 110 of the locking device 100. Additionally, the one or more arms 140, 142, may also be configured to cause the hook 120 to engage and disengage within the main body 110. As seen in the Figures, the locking device 100 has two arms, a first arm 140 and a second arm 142. Each of the first and second arms 140, 142, are attached to the main body 110 within the second section 114 by a pin 145 which is inserted into the openings 117 in the second section and the openings 141, 143, on the first and second arms 140, 142, respectively. The pin 145 fixes each of the first and second arms 140, 142 to the first section 114 of the main body. A portion of the first and second arms 140, 142 extends outside of the main body 110, which allows a surface for a user to press on to move the first and second arms 140, 142 at the pin 145 which functions as an axel. Stated another way, the first and second arms 140, 142 rotate at the pin 145 within the second section 114 of the main body 110.

Figure 7A:
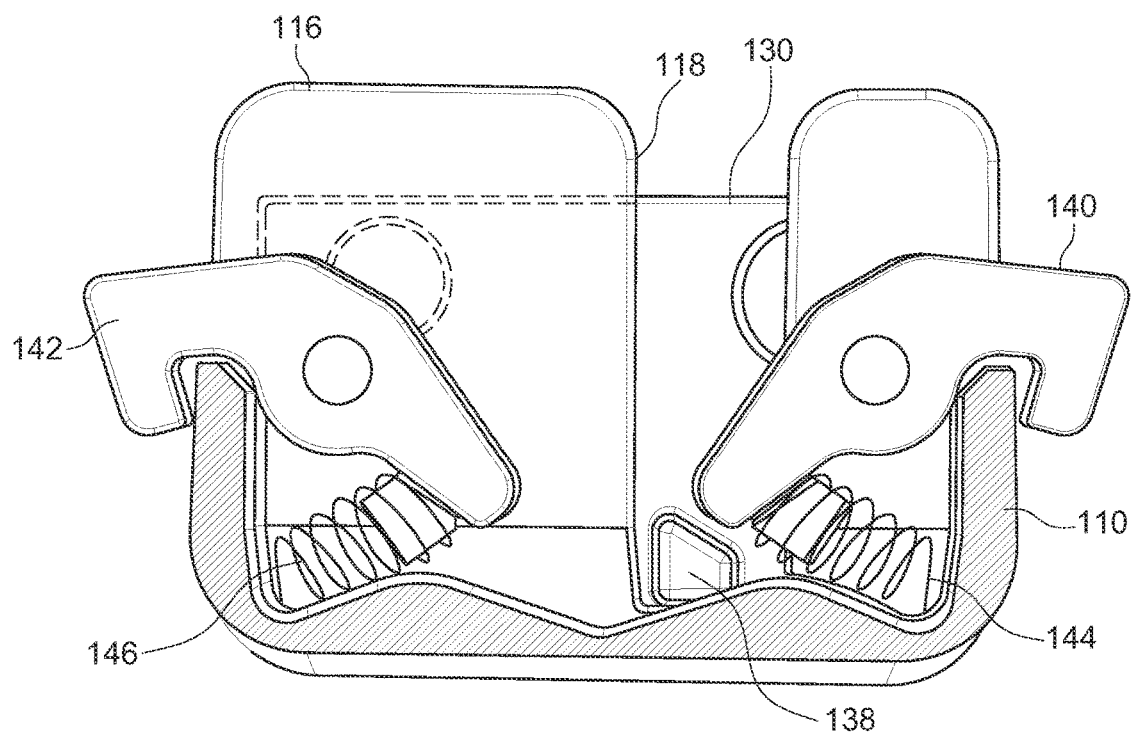
FIG. 7A shows a partial cross-sectional view of the locking device in FIG. 3B taken along line A-A illustrating the lock piece engaging with the first arm.

The first and second arms 140, 142 extend toward the bottom end of the main body 110 and a tip of each arm 140, 142 at the bottom end are relatively close to each other or almost touching. Referring to FIG. 7A the first and second arms 140, 142, may each include a spring engaging portion 140a, 142a, respectively. Specifically, the spring engaging portions 140a, 142a are relatively configured near the tip of each arm 140, 142, and facing toward the side of the main body 110. Each of the spring engaging portions 140a, 142a, are attached to a spring device 144, 146, respectively, which push against an inside wall of the second section 114 in the main body 110. The spring engaging portions 140a, 142a attached to their respective spring device 144, 146, provide a restoring force on the first and second arms 140, 142, respectively. A user applies pressure (by pressing) on the first and second arms 140, 142, rotating the first and second arms at the pin 145. The rotation with the applied pressure moves the first and second 140, 142, upward at the outside portion and the tips away from a center of the bottom end of the second section 114. Releasing the pressure off the first and second arms 140, 142, returns the first and second arms 140, 142, back to their resting position which is with the tips near the center of the bottom end of the second section 114 of the main body 110. The spring devices 144, 146 may be steel springs or other similar devices that provide a restoring force. The first and second arms 140, 142 may be fashioned from the same material as the main body 110 including and not limited to metal, plastic, or other durable materials.

Figure 6A:
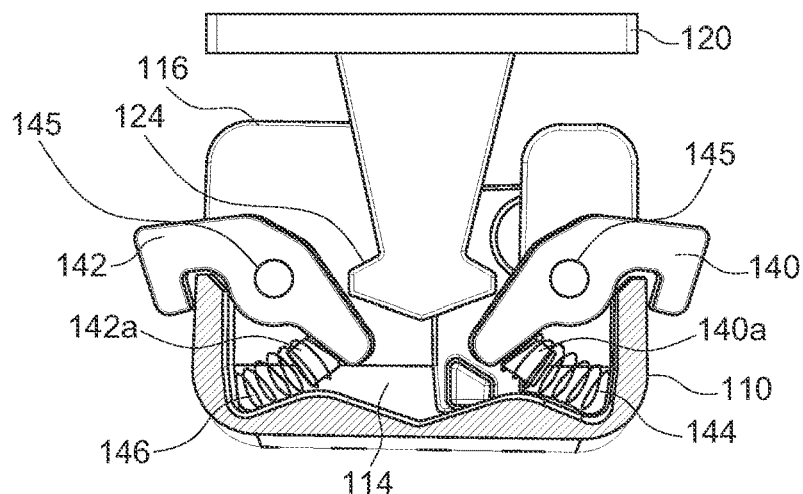
FIG. 6A shows a partial cross-sectional view of the locking device in FIG. 3B taken along line B-B illustrating a hook engaging with a first and second arm of the locking device.
Figure 6B:
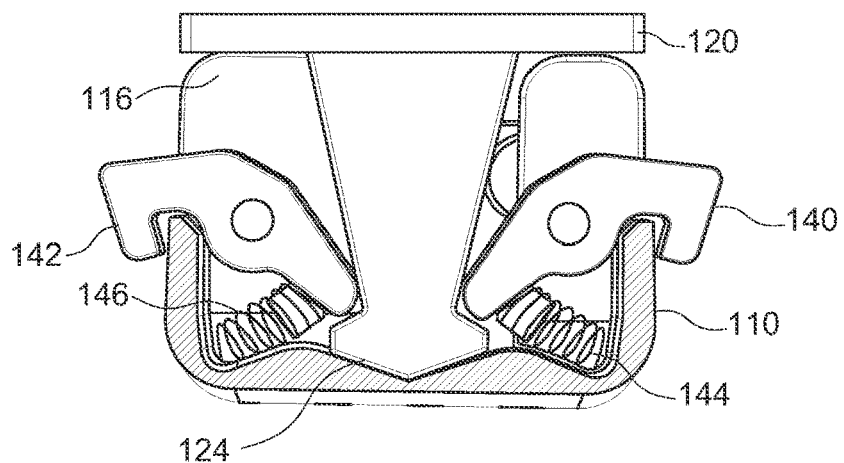
FIG. 6B shows the locking device from FIG. 6A illustrating the hook engaged with the first and second arms of the locking device.
Figure 6C:
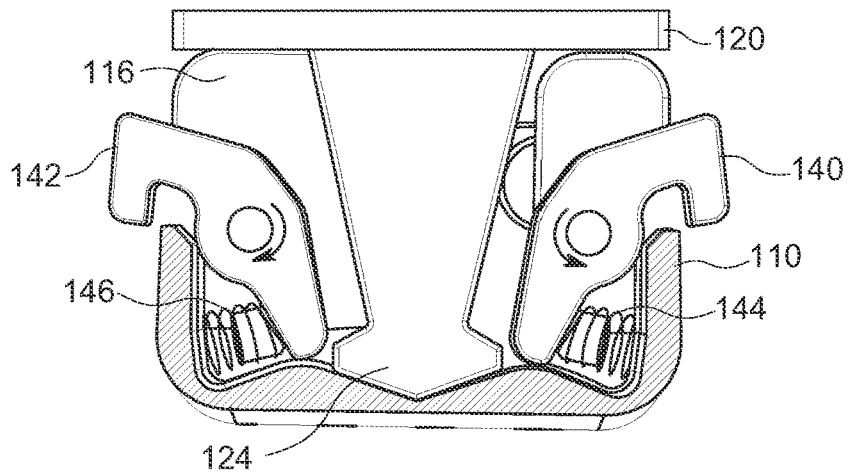
FIG. 6C shows the locking device from FIG. 6B illustrating the hook disengaged from the first and second arms of the locking device.

FIGS. 6A to 6C is a cross-sectional view taken along line B-B in FIG. 3B to depict the hook 120 engaging and disengaging with the first and second arms 140, 142. Disengaging the hook 120 detaches the hook from the main body 110 and opens up the collar portion 410. In other words, the detaching the hook 120 from the main body undoes the collar portion 410. The hook 120 has a broad tip 124 which enters the second section 114 and engages with the first and second arms 140, 142. FIGS. 6A and 6B show that as the hook 120 is inserted into the second section 114, the broad tip 124 pushes against the first and second arms 140, 142, causing them to move backwards to make space for the broad tip 124 on the hook 120 to move past the first and second arms 140, 142 to fit at the bottom end of the second section 114. Once the broad tip 124 on the hook 120 moves past the first and second arms 140, 142, the spring devices 144, 146 move the first and second arms 140 back to their original position engaging them over the broad tip 124 and preventing the hook 120 from moving. Thus, the first and second arms 140, 142 lock the hook 120 into the second section 114. FIG. 6C shows that the hook 120 is disengaged and unlocked when the first and second arms 140, 142 are moved at the pins 145 causing the first and second arms 140, 142 to move away from the broad tip 124 freeing the hook 120 to slide out of the second section 114.

Figure 7B:
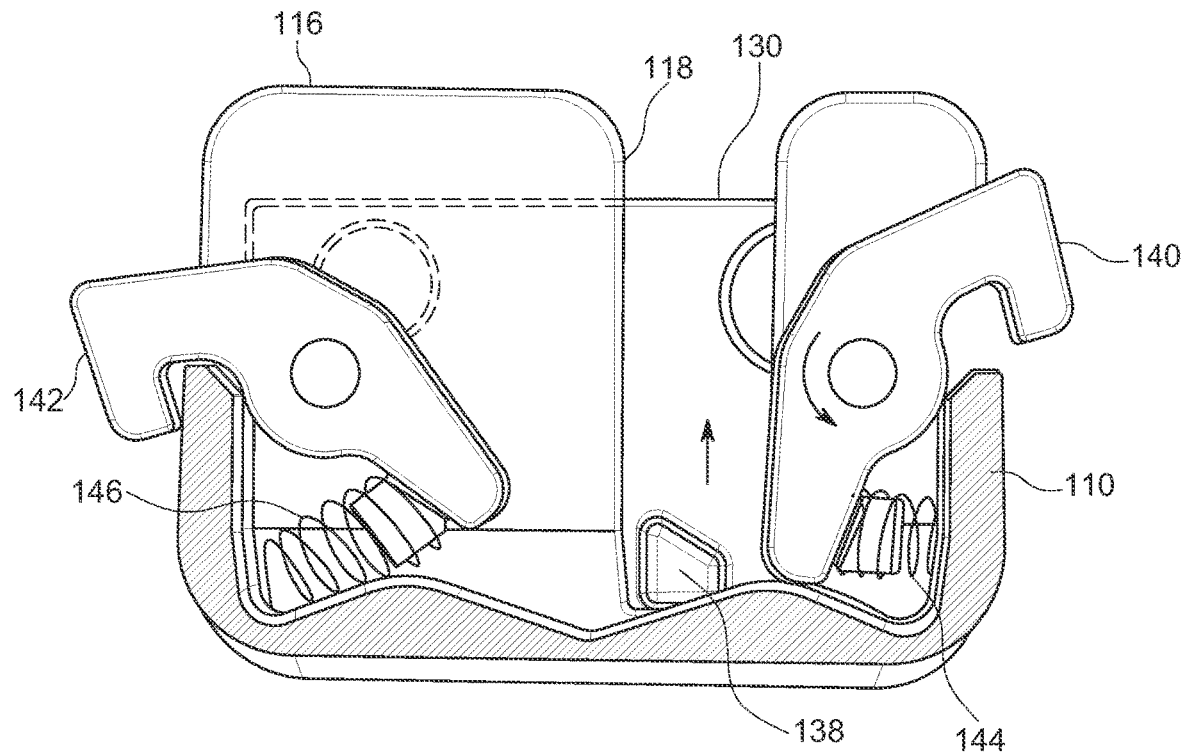
FIG. 7B shows the locking device from FIG. 7A illustrating the lock piece disengaged from the first arm.
Figure 8:
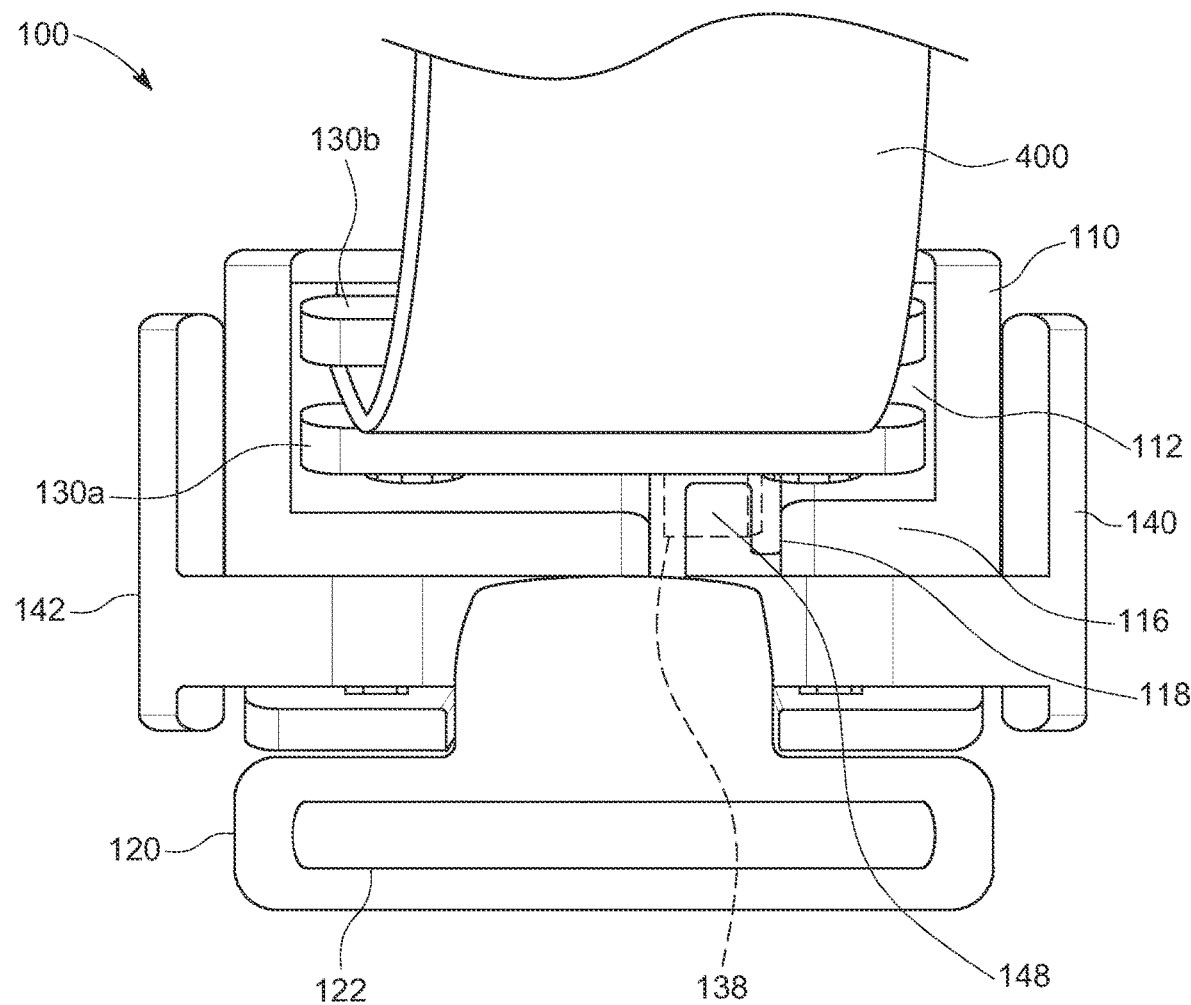
FIG. 8 is an example top view of the locking device according to one or more non-limiting embodiments.

FIGS. 3A and 8 also illustrate that the first arm 140 has a wide tip 148 which extends toward the center wall 116, and more particularly toward the groove 118 in the center wall 116. The wide tip 148 locks the lock piece 130 in the first section 112 of the main body 110. Specifically, the wide tip 148 of the first arm 140 engages with the projecting element 138 on the lock piece 130 to hold the lock piece 130 within the first section 112 of the main body 110. FIGS. 7A and 7B show example cross-sectional views taken from FIG. 3B along line A-A. FIG. 7A and FIG. 8 show the first and second arms 140, 146 connected within the second section 114 with a view of the lock device 130 within the first section (not shown in this figure). The projecting element 138 is shown in the groove 118 of the center wall 116. The first arm 140 is shown to be engaged with the lock piece 130 by preventing the movement of the lock piece out of the first section of the main body 110. Specifically, the wide tip 148 is above the projecting element 138 in the groove of the main body 110 such that the lock piece 130 is prevented from moving upward by the projecting element 138 prevented from moving upward in the groove 118 by the wide tip 148. FIG. 7B shows the first arm 140 disengaged from the lock piece 130. Specifically, the first arm 140 may be moved at the pin 145 causing the wide tip 148 to be moved away from a position above the projecting element 138 and thus allowing the lock device 130 to move upward with the projecting element 138 moving upward through the groove 118 unhindered.

Figure 9A:
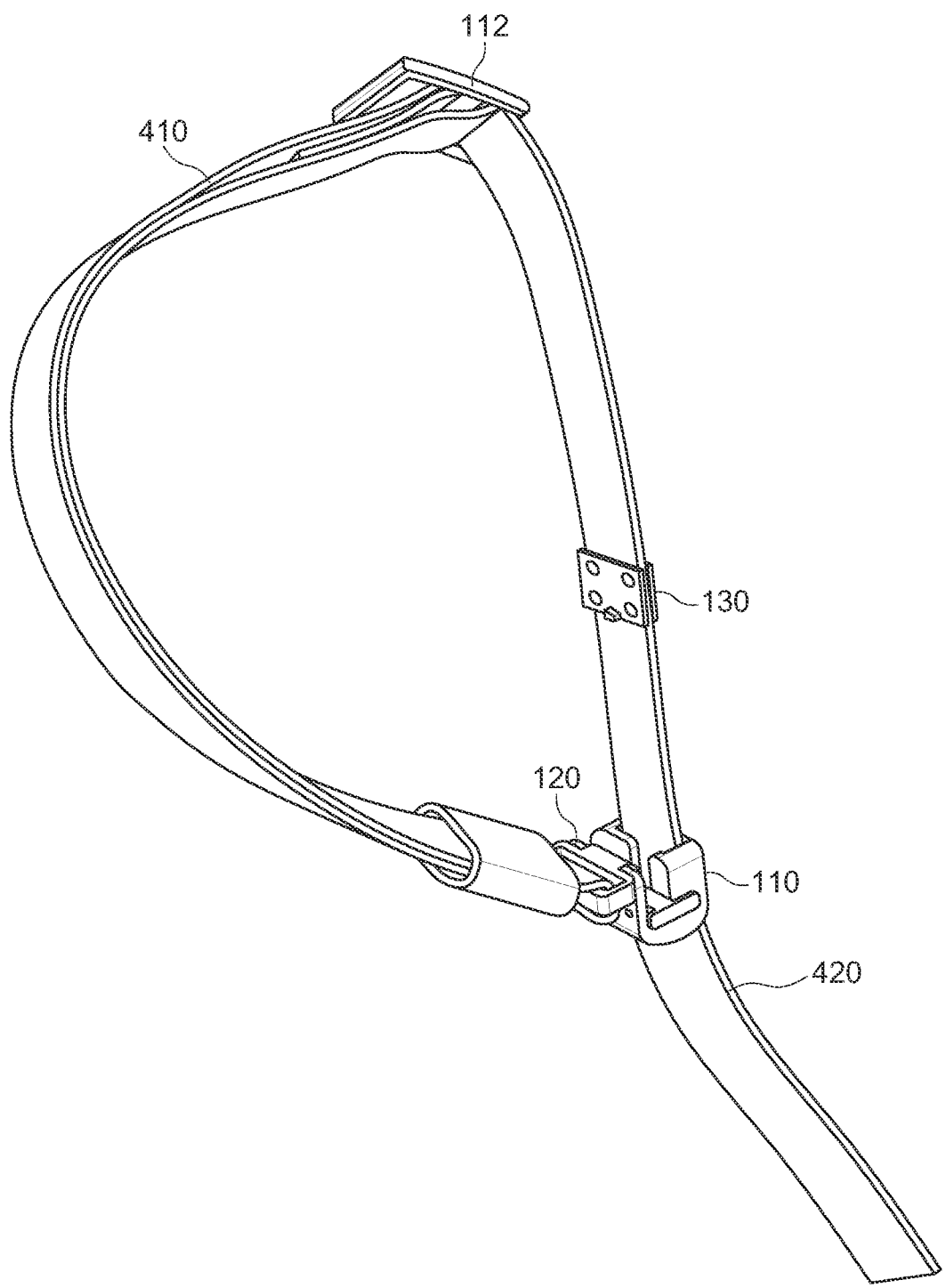
FIG. 9A shows an example view of the collar portion of the leash with the lock piece disengaged from the main body of the locking device.
Figure 9B:
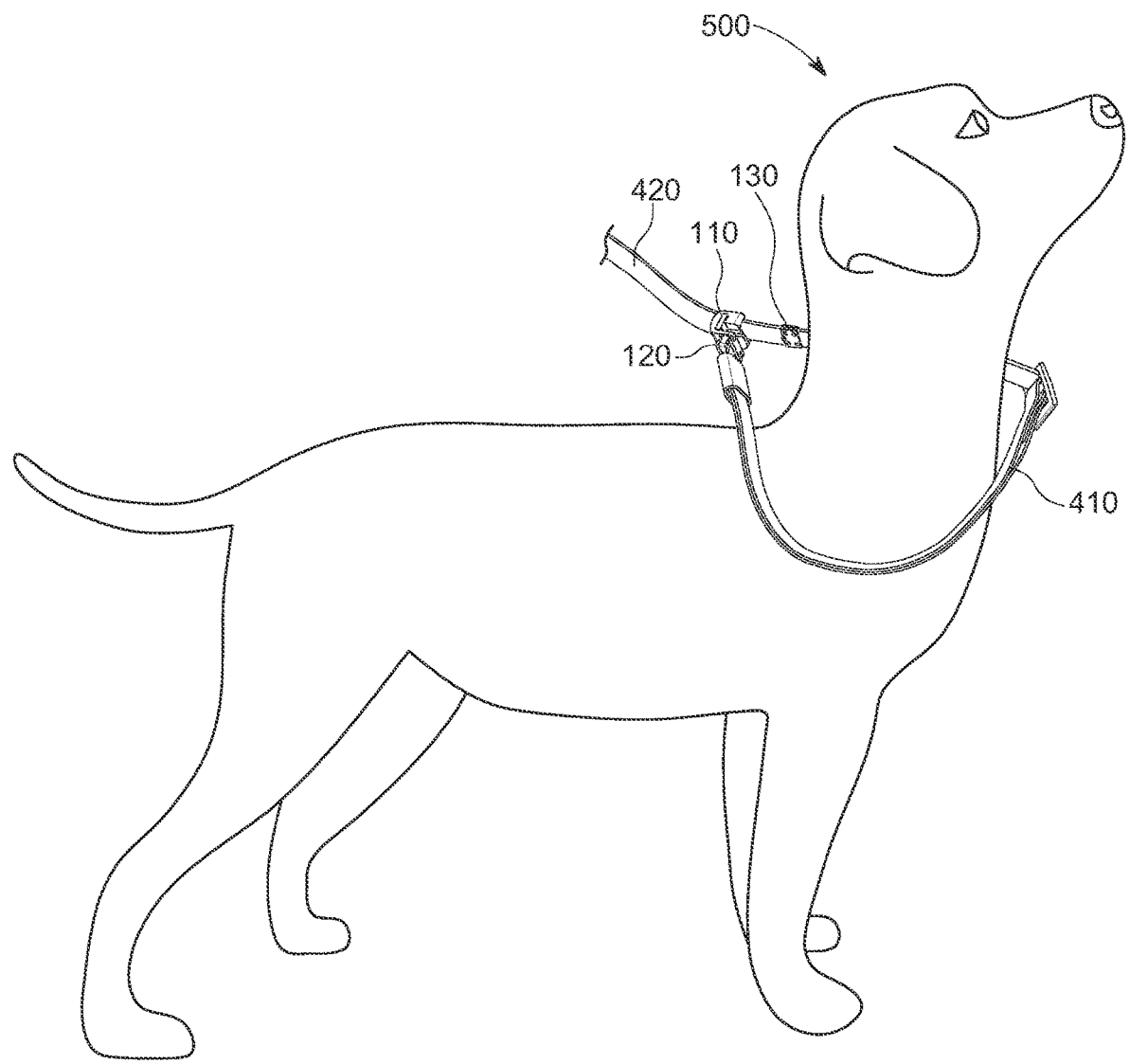
FIG. 9B shows the collar portion of the leash integrated with the locking device placed around a dog's neck with the lock piece disengaged from the main body.
Figure 9C:
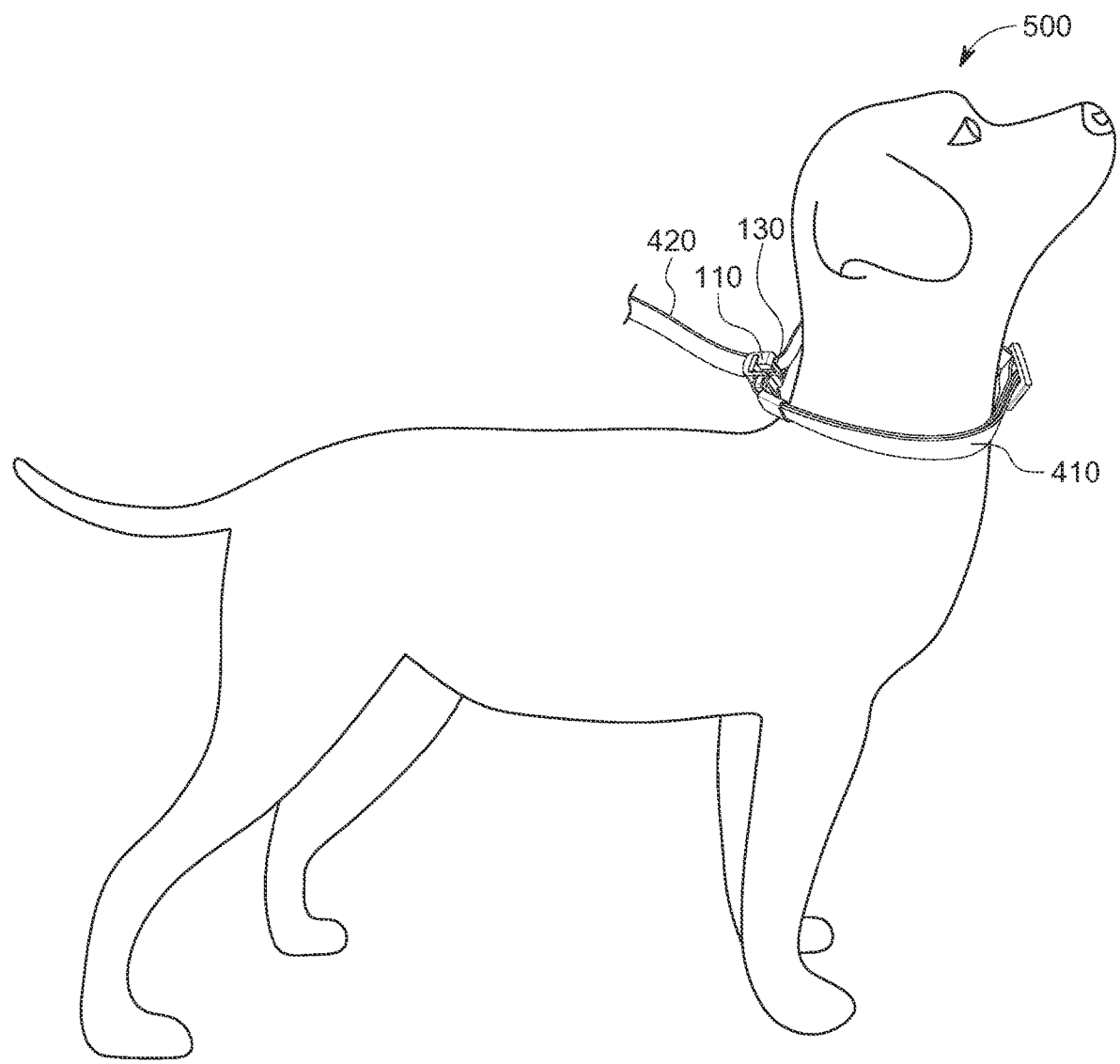
FIG. 9C shows the locking device on the leash in a locked position.
Figure 9D:
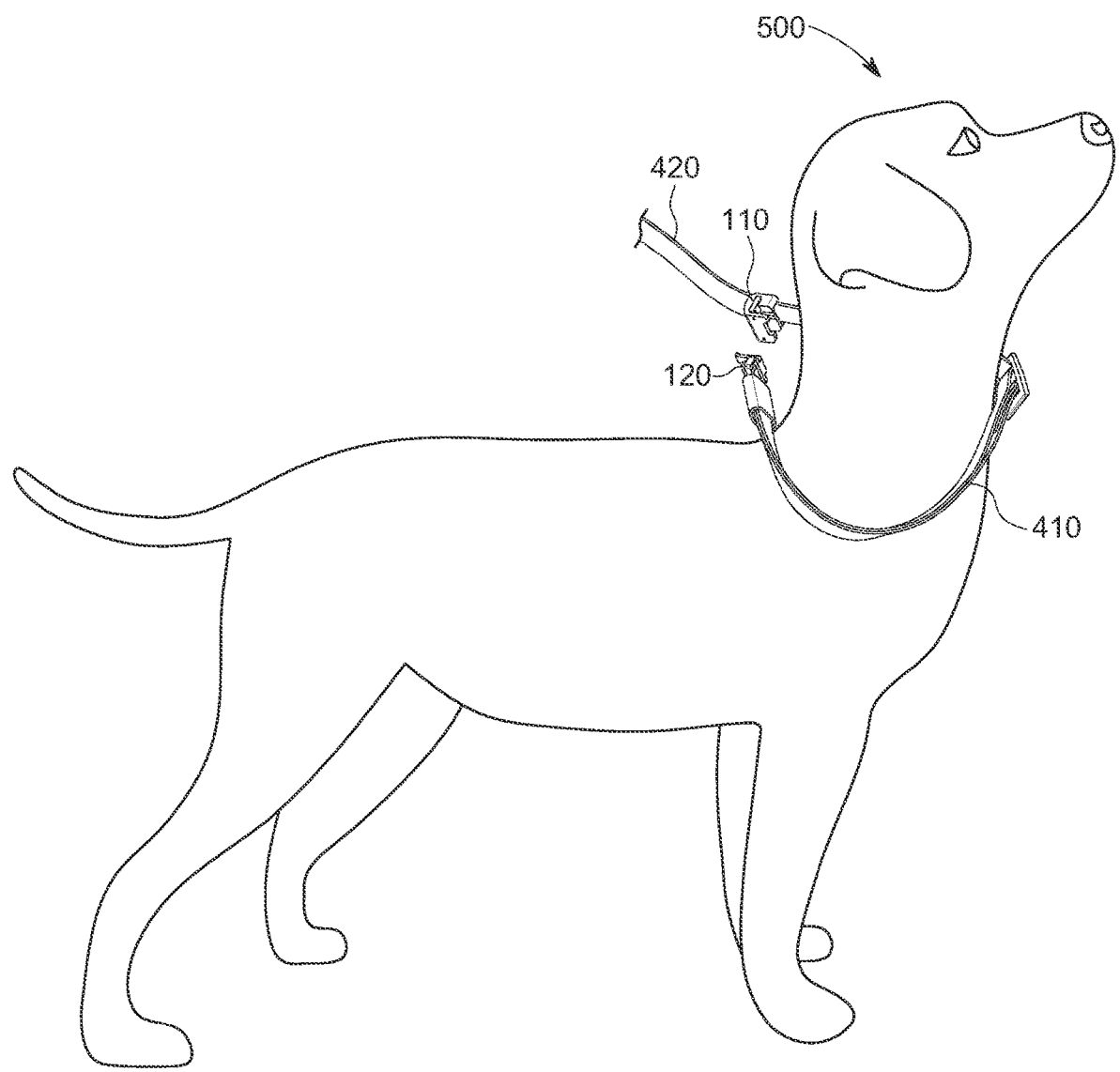
FIG. 9D shows the hook released from the main body to quickly remove the collar portion of the leash from the dog's neck.

FIGS. 9A to 9D depict an embodiment of the locking device 100 integrated onto a leash 400 being used with a dog 500. In FIG. 9A, a user would ensure that the lock piece is disengaged and not inserted into the main body 110 of the locking device. The user may widen the collar portion 410 of the leash 400 to be able to slip it over the dog's head. FIG. 9B shows that the collar portion 410 has been slipped over the dog's head and is loosely placed around the dog's neck. In FIG. 9C, the strap section 420 of the leash 410 may be pulled on to slide the leash through the main body 110 moving the lock piece 130 into the main body 110 to engage with the first arm locking the lock piece into place. Once locked, the width of the collar portion 410 is set and as the leash is pulled on while around the dog's neck, the collar portion will not tighten or loosen. FIG. 9D shows where the hook 120 can detach from the main body 110 for a quick release of the locking device from the dog without needing to slip the collar portion 410 over the dog's head. This may be useful for speedily releasing the dog from the leash 400.

The locking device 100 integrated onto a leash 400 has several advantages over existing dog collars. The locking device 100 may be slipped over the head of the dog and secured by sliding the main body 110 along the leash until the lock piece 130 fixed onto the leash 400 enters the main body 110. Thus, the locking device 100 integrated onto a leash may be more easily and more conveniently placed over on a dog. The lock piece 130 engages with the first arm to prevent the collar portion 410 placed around the dog's neck from loosening by preventing the lock piece from sliding back out of the open top end. Additionally, the lock piece 130 is able to nest within the main body by pushing against the closed bottom end and thus the collar portion is prevented from tightening an further on the dog's neck. The size of the collar portion 410 can be adjusted using the adjustment mechanism 412 so the leash 400 integrated with the locking device 100 can be adjusted for dogs of different sizes. The quick release mechanism of the hook 120 allows the leash 400 integrated with the locking device 100 to be quickly and easily released from around the dog's neck.

Figure 10A:
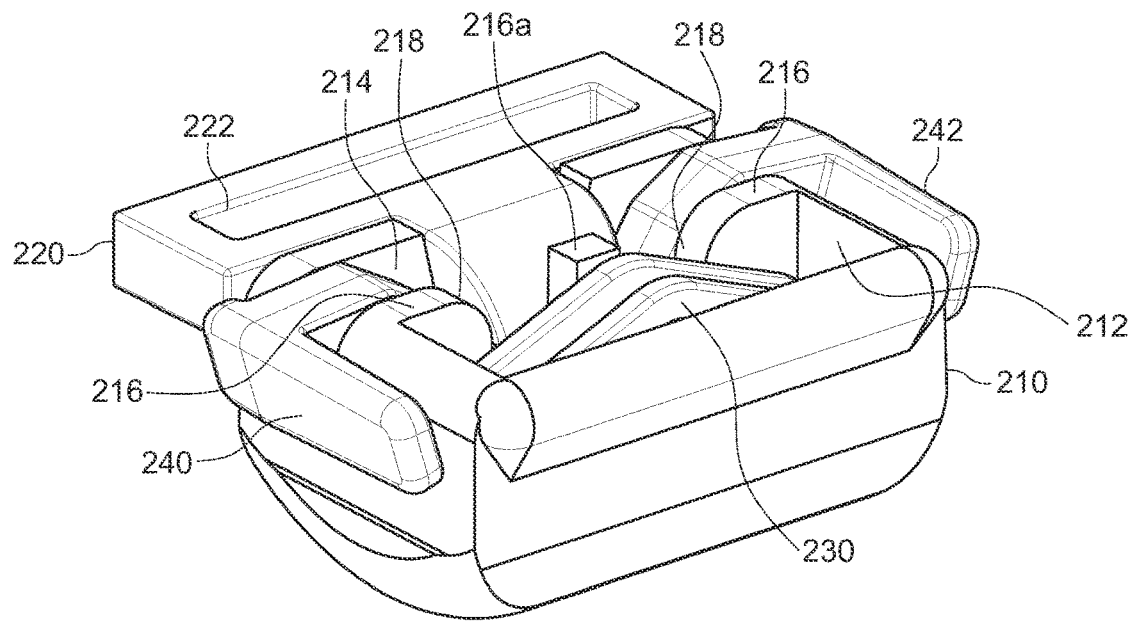
FIG. 10a shows an example view of an alternative embodiment of a locking device.
Figure 10B:
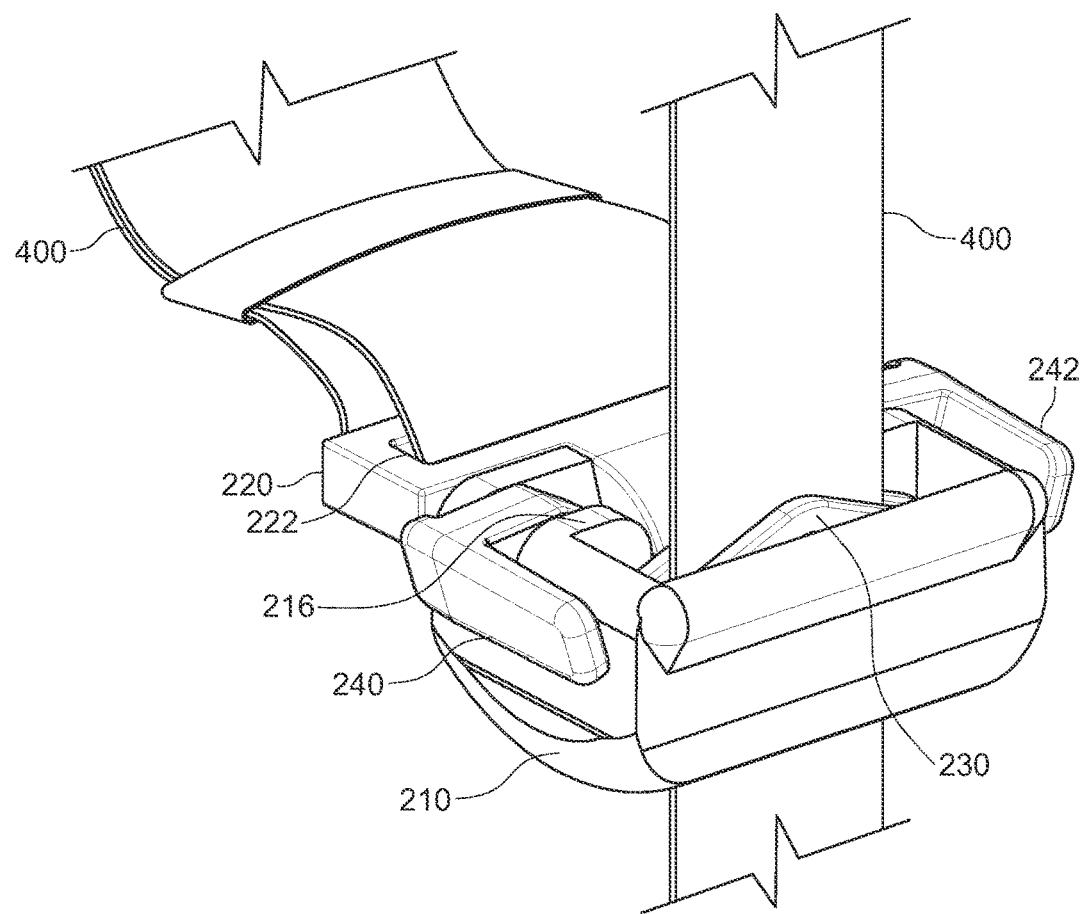
FIG. 10B shows the alternative embodiment of the locking device integrated with a leash and with a hook and a lock piece engaged in a main body of the locking device.
Figure 11:
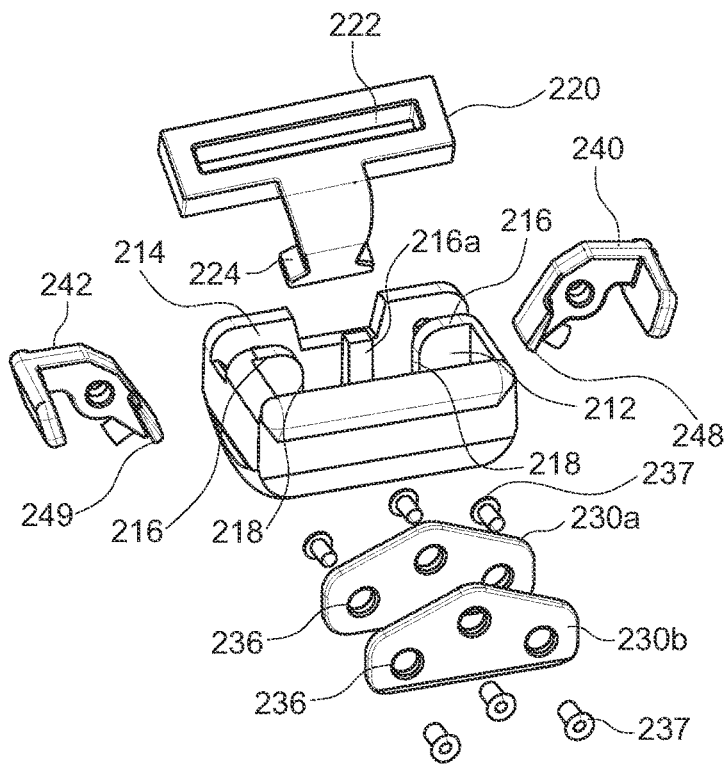
FIG. 11 is an exploded view of the alternative embodiment of the locking device.

FIGS. 10A to 14 depict an alternative embodiment of a locking device 200 that may be integrated onto a leash 400 that can be secured around the neck of a dog similar to the disclosure above in reference to the first embodiment of the locking device 100 of FIG. 1. FIG. 10A illustrates the locking device 200 only in order to provide a clear view of all the elements that comprise the locking device 200. FIG. 10B illustrates the locking device 200 integrated with leash 400 to show that the like elements of the locking device 200 are integrated onto the leash 400 as discussed above in reference to the locking device 100 integrated onto the leash 400. FIG. 11 illustrates an exploded view of the locking device 200 only to provide a clearer view of the elements comprising the locking device 200.

Figure 12:
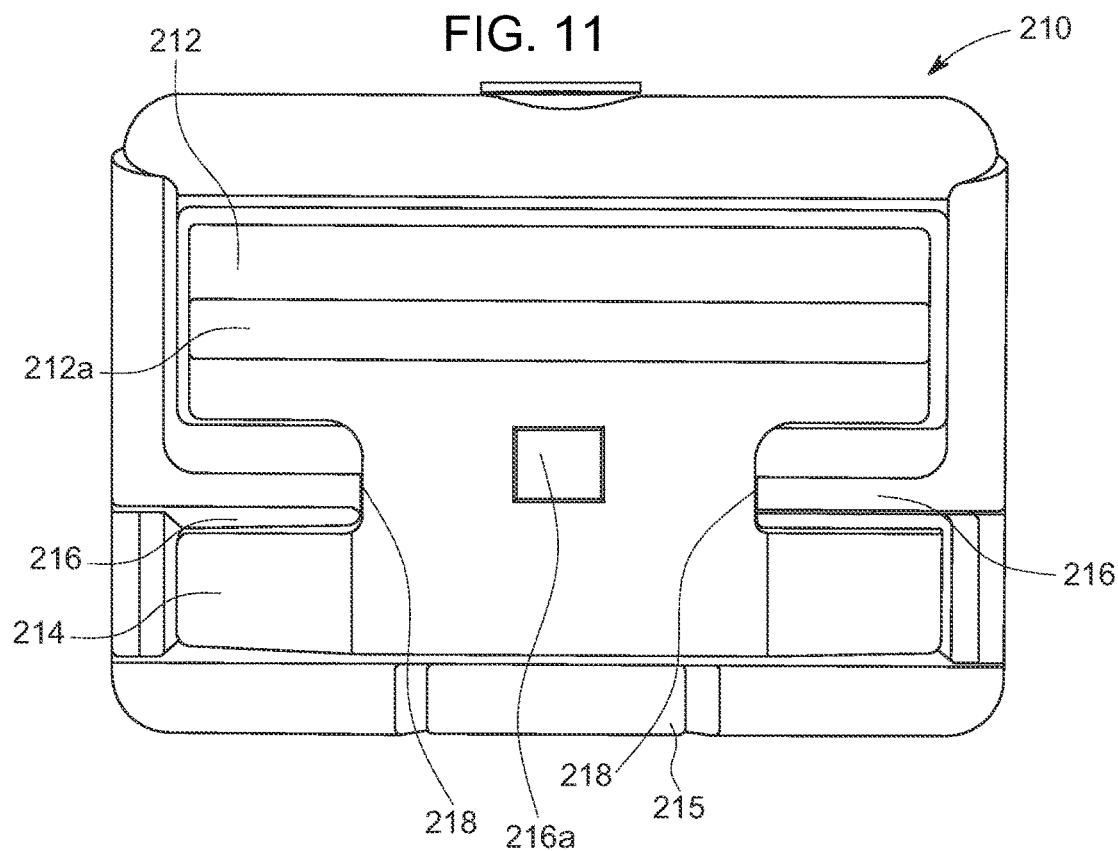
FIG. 12 shows a top view of a main body of the alternative embodiment of the locking device.
Figure 13:
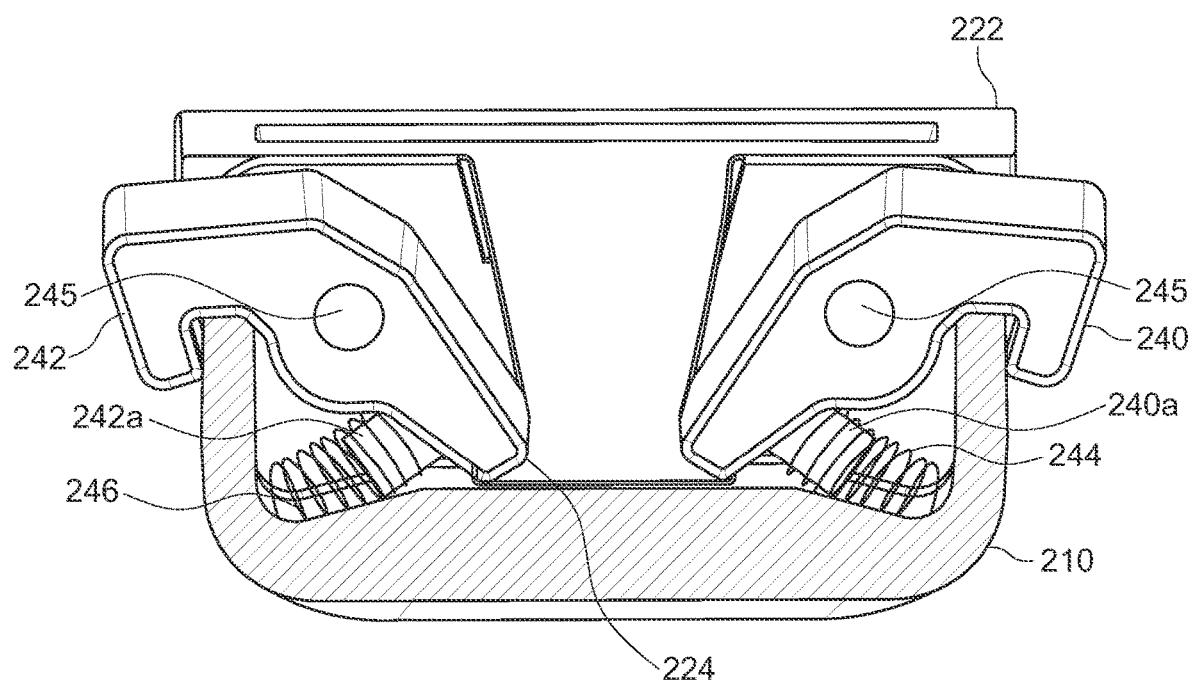
FIG. 13 shows an internal view of the alternate embodiment of the locking device illustrating the hook engaged with the first and second arms.
Figure 14:
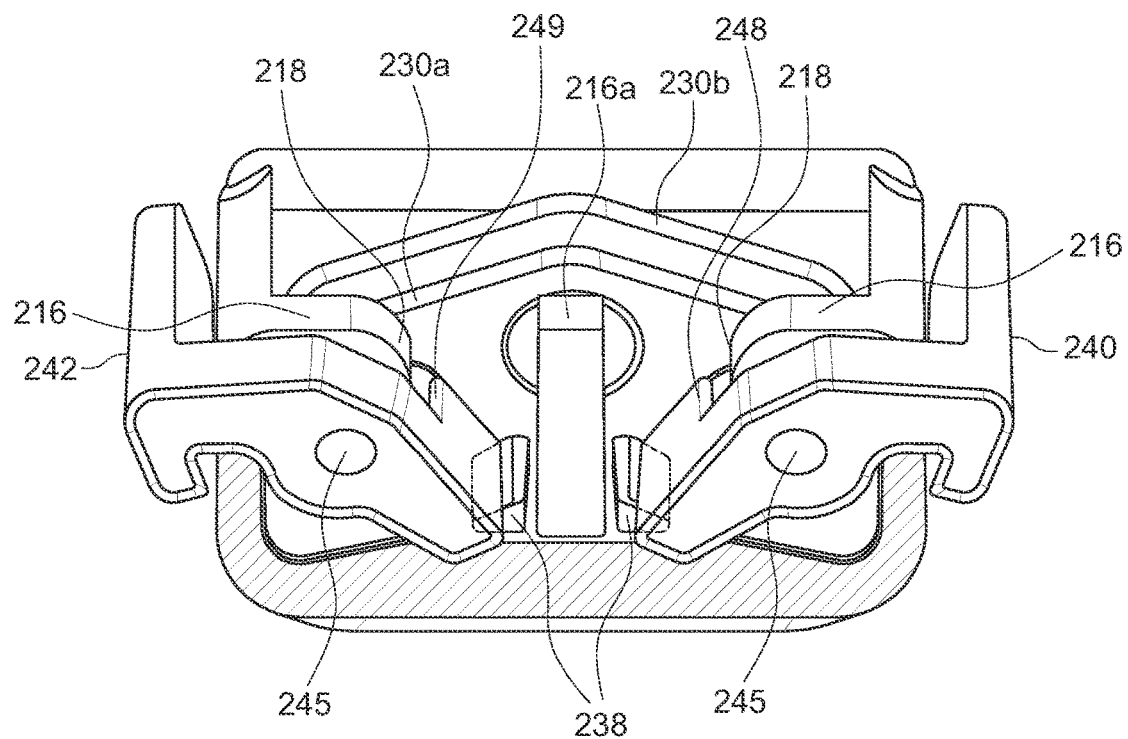
FIG. 14 shows an internal view of the alternate embodiment of the locking device illustrating the lock piece engaged with the first and second arms.

The locking device 200 comprises of similar elements to the locking device 100 including a main body 210, a hook 220, a lock piece 230, and first and second arms 240, 242. All elements are the same as discussed in the above embodiment of the locking device 100. There are a few differences which will be discussed herein. As best seen in FIGS. 11 and 12, the main body 210 has a center wall 216 with two parallel grooves 218 separated by a center post 216a (whereas the locking device 100 discussed above has one groove 118). The first and second arms 240, 242 both engage with the lock piece 230, and both the first and second arms 240, 242 are configured with a wide tip 248, 249, respectively as seen in FIGS. 11 and 14. Thus, as seen in FIG. 14, the lock piece 230 is configured with two projecting elements 238 wherein each of the projecting elements is guided into one groove so that each of the two grooves has one of the projecting elements 238 side by side as the lock piece is inserted into the first section. The two projecting elements 238 engage with the wide tips 248, 249, on the first and second arms 240, 242, respectively. The first and second arms 240, 242, also engage with the hook 220. The process to engage and disengage the hook 220 is the same as discussed above for the locking device 100. However, both the first and second arms 240, 242, need to be pressed on to move the arms 240, 242 away from the projecting elements 238 on the lock piece to allow the lock to be moved out of a first section 212 of the main body 210. The first and second arms 240, 242 need only be pressed halfway to move them away from the projecting elements 238 to disengage and move the lock piece 230. Fully depressing the first and second arms 240, 242, moves them away from a broad tip 224 of the hook 220 and thus allowing both the hook 220 and the lock piece 230 to disengage and move out of the main body 210.

Accordingly, the present description provides for various embodiments for a locking device that can be integrated onto a leash that can be secured around the neck of a dog, other animal, or object. Many uses and advantages are offered by the locking device as described above in one or more non-limiting embodiments in the present description.

The corresponding structures, materials, acts, and equivalents of any means or step plus function elements in the claims below are intended to include any structure, material, or act for performing the function in combination with other claimed elements as specifically claimed. The description of the present invention has been presented for purposes of illustration and description but is not intended to be exhaustive or limited to the invention in the form disclosed. Many modifications and variations will be apparent to those of ordinary skill in the art without departing from the scope and spirit of the invention.

The embodiments were chosen and described in order to best explain the principles of the invention and the practical application, and to enable others of ordinary skill in the art to understand the invention for various embodiments with various modifications as are suited to the particular use contemplated. The present invention, according to one or more embodiments described in the present description, may be practiced with modification and alteration within the spirit and scope of the appended claims. Thus, the description is to be regarded as illustrative instead of restrictive of the present invention.

What is claimed is:

1. A device comprising:
   a main body having four sides, a center wall, a closed bottom, and an open top, wherein the center wall divides the main body into a first section and a second section;
   a first arm and a second arm connected to the main body;
   a hook configured to slide into the main body and engage with the first and second arms within the main body;
   a lock piece configured to slide into the main body to nest against the closed bottom and engage with the first arm; and
   wherein the hook and the lock piece are fixedly connected to a leash material and the main body has a slit in the closed bottom of the first section, wherein the leash material is inserted through the slit so the main body is slidably connected to the leash material, wherein the main body is prevented from sliding when the lock piece slides into the main body.

2. The device of claim 1, wherein the hook removably connects to the lock piece to form a collar portion and a strap, wherein an adjustment piece between the hook and the lock piece is configured to adjust a length of the collar portion.

3. The device of claim 1, wherein the hook has an opening configured to allow the leash material to fit through and loop around the opening to connect the leash material to the hook.

4. The device of claim 1, wherein the lock piece has a first piece and a second piece which are fixedly connected to the leash material, wherein the leash material is positioned between and fixedly connected to the first piece and the second piece by a securing element.

5. The device of claim 4, wherein a surface of the first piece and a surface of the second piece which are placed against the leash material are each configured with a plurality of spikes.

6. The device of claim 2, wherein the collar portion is formed with the lock piece and the hook engaged with the first and second arms in the main body, and wherein the lock piece is nesting within the first section and the hook is inserted in the second section.

7. The device of claim 1, wherein the first arm and the second arm are each connected to the main body by a pin which is placed within openings that traverse through the first and second arms and a side of the main body and the center wall defining the second section, wherein the first and second arms are configured to move at the pin, and wherein the first and second arms each have a spring engaging portion and a connected spring for moving the first and second arms back to their original positions when they are moved at the pins.

8. The device of claim 7, wherein the hook is configured with a broad tip which engages with the first and second arms when the hook is inserted into the second section of the main body;
   wherein the first and second arms are engaged with the hook by resting above the broad tip to prevent the hook from sliding out of the second section; and
   wherein the hook is disengaged when the first and second arms are moved away from the broad tip of the hook freeing the hook to slide out of the second section.

9. The device of claim 7, wherein the first arm has a wide tip which extends toward a groove in the center wall, wherein the first arm engages with a projecting element configured on the lock piece which projects outward from the lock piece and is configured to fit within the groove as the lock piece slides in the first section;
   wherein the wide tip of the first arm is above the projecting element and is configured to prevent the lock piece from moving out of the first section; and
   wherein the lock piece is disengaged when the first arm with the wide tip is moved away from the projecting element freeing the lock piece to slide out of the first section.

10. A device comprising:
    a main body having four sides, a center wall, a closed bottom, and an open top, wherein the center wall divides the main body into a first section and a second section;
    a first arm and a second arm connected to the main body;
    a hook configured to slide into the main body and engage with the first and second arms within the main body;
    a lock piece configured to slide into the main body to nest against the closed bottom and engage with the first arm and the second arm; and
    wherein the hook and the lock piece are fixedly connected to a leash material and the main body has a slit in the closed bottom of the first section, wherein the leash material is inserted through the slit so the main body is slidably connected to the leash material, wherein the main body is prevented from sliding when the lock piece slides into the main body.

11. The device of claim 10, wherein the hook removably connects to the lock piece to form a collar portion and a strap, wherein an adjustment piece between the hook and the lock piece is configured to adjust a length of the collar portion.

12. The device of claim 10, wherein the hook has an opening configured to allow the leash material to fit through and loop around the opening to connect the leash material to the hook.

13. The device of claim 10, wherein the lock piece has a first piece and a second piece which are fixedly connected to the leash material, wherein the leash material is positioned between and fixedly connected to the first piece and the second piece by a securing element.

14. The device of claim 13, wherein a surface of the first piece and a surface of the second piece which are placed against the leash material are each configured with a plurality of spikes.

15. The device of claim 12, wherein the collar section is formed with the lock piece and the hook engaged with the first and second arms in the main body, and wherein the lock piece is nesting within the first section and the hook is inserted in the second section.

16. The device of claim 10, wherein the first arm and the second arm are connected to the main body by a pin which is placed within openings that traverse through the first and second arms, a side of the main body, and the center wall defining the second section, wherein the first and second arms are configured to move at the pin, and wherein the first and second arms each have a spring engaging portion and a connected spring for moving the first and second arms back to their original positions when they are moved at the pins.

17. The device of claim 16, wherein the hook is configured with a broad tip which engages with the first and second arms when the hook is inserted into the second section of the main body;
wherein the first and second arms are engaged with the hook by resting above the broad tip to prevent the hook from sliding out of the second section; and
wherein the hook is disengaged when the first and second arms are moved away from the broad tip of the hook freeing the hook to slide out of the second section.

18. The device of claim 16, wherein the lock piece has two projecting elements configured on a surface facing toward the center wall, wherein the two projecting elements extend outward;
wherein the center wall has two parallel grooves between a center post, wherein each groove of the two parallel grooves accommodates one of the two projecting elements when the lock piece slides in the first section;
wherein the first arm and the second arm each have a wide tip wherein each of the wide tips extends toward the two parallel grooves to engage with the two projecting elements, wherein the wide tips extending above the two projecting elements prevent the lock piece from moving out of the first section; and
wherein the lock piece is disengaged when the wide tips of the first and second arms are moved away from the two projecting elements freeing the lock piece to slide out of the first section.

\* \* \* \* \*